US009264990B2

(12) United States Patent
Di Girolamo et al.

(10) Patent No.: US 9,264,990 B2
(45) Date of Patent: *Feb. 16, 2016

(54) PAGING OVER A HIGH-SPEED DOWNLINK SHARED CHANNEL

(71) Applicant: InterDigital Technology Corporation, Wilmington, DE (US)

(72) Inventors: Rocco Di Girolamo, Laval (CA); Diana Pani, Montreal (CA); Christopher Cave, Dollard-des-Ormeaux (CA); Alexander Reznik, Titusville, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,318

(22) Filed: Feb. 4, 2014

(65) Prior Publication Data

US 2014/0153467 A1    Jun. 5, 2014

Related U.S. Application Data

(63) Continuation of application No. 12/026,093, filed on Feb. 5, 2008, now Pat. No. 8,744,496.

(60) Provisional application No. 60/888,209, filed on Feb. 5, 2007, provisional application No. 60/894,611, filed on Mar. 13, 2007, provisional application No. 60/895,248, filed on Mar. 16, 2007.

(51) Int. Cl.
*H04W 52/02* (2009.01)
*H04W 68/02* (2009.01)

(52) U.S. Cl.
CPC ...... *H04W 52/0209* (2013.01); *H04W 52/0216* (2013.01); *H04W 68/025* (2013.01)

(58) Field of Classification Search
CPC ................ H04W 52/0209; H04W 52/0216
USPC .......................................... 370/329; 455/458
See application file for complete search history.

(56) References Cited

U.S. PATENT DOCUMENTS 7,295,845 B2    11/2007  Larmala et al.
7,529,211 B2     5/2009  Narasimha et al.
(Continued)

FOREIGN PATENT DOCUMENTS

CN    1453947    11/2003
EP    1357765    10/2003
(Continued)

OTHER PUBLICATIONS

"Universal Mobile Telecommunications System (UMTS); UTRA High Speed Downlink Packet Access (HSDPA); Overall description; Stage 2 (3GPP TS 25.308 version 6.3.0 Release 6)" ETSI Standards, European Telecommunications Standards Institute; Sophia-Antipo, FR, 3GPP TS 25.308 V6.3.0, Dec. 2004, 16 pages.
(Continued)

*Primary Examiner* — Qun Shen
(74) *Attorney, Agent, or Firm* — Eric Berkowitz

(57) ABSTRACT

An apparatus and methods are provided for paging in a HSDPA connected mode CELL_PCH or URA_PCH state. Preferably, a WTRU is configured to select various PICH information that is broadcast by a base station. The WTRU is preferably configured to receive paging messages, based on the selected PICH information. In one embodiment, a preferred WTRU is configured to receive paging messages, based on a PICH, a HS-SCCH, and a HS-PDSCH. In another embodiment, a preferred WTRU is configured to receive paging messages, based on a PICH and a HS-PDSCH. In both embodiments, a time delay parameter is preferably used so that the WTRU may listen for either the HS-SCCH or HS-PDSCH for a period of time and return to a sleep mode if no paging message is received.

9 Claims, 5 Drawing Sheets

(56) References Cited

U.S. PATENT DOCUMENTS

| | | | |
|---|---|---|---|
| 7,649,865 | B2 | 1/2010 | Sarkkinen |
| 8,090,390 | B2 | 1/2012 | Lee et al. |
| 2003/0035403 | A1 | 2/2003 | Choi et al. |
| 2004/0023672 | A1 | 2/2004 | Terry |
| 2004/0142706 | A1 | 7/2004 | Kim et al. |
| 2004/0157626 | A1 | 8/2004 | Park et al. |
| 2004/0176112 | A1 | 9/2004 | Beckmann et al. |
| 2005/0007990 | A1 | 1/2005 | Beckmann |
| 2005/0070274 | A1 | 3/2005 | Pedlar et al. |
| 2005/0090278 | A1 | 4/2005 | Jeong et al. |
| 2005/0117553 | A1 | 6/2005 | Wang et al. |
| 2005/0272459 | A1* | 12/2005 | Lee et al. .................. 455/522 |
| 2006/0089142 | A1 | 4/2006 | Vuorinen et al. |
| 2006/0094408 | A1 | 5/2006 | Hu |
| 2006/0104225 | A1 | 5/2006 | Kim et al. |
| 2006/0154680 | A1 | 7/2006 | Kroth et al. |
| 2006/0166688 | A1 | 7/2006 | Sun |
| 2007/0060175 | A1 | 3/2007 | Park et al. |
| 2007/0133479 | A1 | 6/2007 | Montojo et al. |
| 2007/0189236 | A1 | 8/2007 | Ranta-aho et al. |
| 2008/0014969 | A1* | 1/2008 | Laroia et al. ............... 455/458 |
| 2008/0130548 | A1 | 6/2008 | Kaikkonen et al. |
| 2008/0220789 | A1 | 9/2008 | Kuo |
| 2009/0318170 | A1* | 12/2009 | Lee et al. .................. 455/458 |
| 2010/0074192 | A1 | 3/2010 | Beming et al. |

FOREIGN PATENT DOCUMENTS

| | | |
|---|---|---|
| EP | 1 377 096 A1 | 1/2004 |
| GB | 2 371 179 B | 1/2004 |
| JP | 2010-504023 | 2/2010 |
| JP | 2010-507323 | 3/2010 |
| JP | 2010-514376 | 4/2010 |
| RU | 2005 117 382 A | 1/2006 |
| RU | 2006 105 411 A | 7/2006 |
| WO | WO-03/058988 A1 | 7/2003 |
| WO | WO-2004/043099 | 5/2004 |
| WO | WO-2005/006829 A2 | 1/2005 |
| WO | WO-2005/020474 | 3/2005 |
| WO | WO-2005/022772 A1 | 3/2005 |
| WO | WO-2006/033636 A1 | 3/2006 |
| WO | WO-2008/033072 | 3/2008 |
| WO | WO 2008/054159 * | 5/2008 |
| WO | WO-2008/054159 | 5/2008 |
| WO | WO-2008/076991 | 6/2008 |

OTHER PUBLICATIONS

"3rd Generation Partnership Project, Technical Specification Group Radio Access Network; Radio Resource Control Protocol Specification (Release 7)", 3GPP TS 25.331 V7.3.0, Dec. 2006, 1316 pages.

"3rd Generation Partnership Project; Technical Specification Group Radio Access Network; High Speed Downlink Packet Access (HSDPA) Overall Description; Stage 2 (Release 7)", 3GPP TS 25.308 V7.5.0, Dec. 2007, 50 pages.

"3rd Generation Partnership Project; Technical Specification Group Radio Access Network; High Speed Downlink Packet Access (HSDPA) Overall Description; Stage 2 (Release 8)", 3GPP TS 25.308 V8.0.0, Dec. 2007, 50 pages.

"3rd Generation Partnership Project; Technical Specification Group Radio Access Network; High Speed Downlink Packet Access (HSDPA); Overall Description; Stage 2 (Release 7)", 3GPP TS 25.308 V7.1.0, Dec. 2006, 34 pages.

"3rd Generation Partnership Project; Technical Specification Group Radio Access Network; Medium Access Control (MAC) Protocol Specification (Release 7)", 3GPP TS 25.321 V7.3.0, Dec. 2006, 113 pages.

"3rd Generation Partnership Project; Technical Specification Group Radio Access Network; Medium Access Control (MAC) Protocol Specification (Release 7)", 3GPP TS 25.321 V7.7.0, Dec. 2007, 146 pages.

"3rd Generation Partnership Project; Technical Specification Group Radio Access Network; Medium Access Control (MAC) Protocol Specification (Release 8)", 3GPP TS 25.321 V8.0.0, Dec. 2007, 146 pages.

"3rd Generation Partnership Project; Technical Specification Group Radio Access Network; Physical channels and mapping of transport channels onto physical channels (FDD) (Release 7)", 3GPP TS 25.211 V7.0.0, Mar. 2006, 50 pages.

"3rd Generation Partnership Project; Technical Specification Group Radio Access Network; Physical channels and mapping of transport channels onto physical channels (FDD) (Release 7)", 3GPP TS 25.211 V7.4.0, Nov. 2007, 54 pages.

"3rd Generation Partnership Project; Technical Specification Group Radio Access Network; Physical channels and mapping of transport channels onto physical channels (FDD) (Release 7)", 3GPP TS 25.211 V7.3.0, Sep. 2007, 54 pages.

"3rd Generation Partnership Project; Technical Specification Group Radio Access Network; Radio Link Control (RLC) Protocol Specification (Release 7)", 3GPP TS 25.322 V7.2.0, Sep. 2006, 86 pages.

"3rd Generation Partnership Project; Technical Specification Group Radio Access Network; Radio Link Control (RLC) Protocol Specification (Release 7)", 3GPP TS 25.322 V7.5.0, Dec. 2007, 88 pages.

"3rd Generation Partnership Project; Technical Specification Group Radio Access Network; Radio Link Control (RLC) Protocol Specification (Release 8)", 3GPP TS 25.322 V8.0.0, Dec. 2007, 89 pages.

"3rd Generation Partnership Project; Technical Specification Group Radio Access Network; Radio Resource Control (RRC) Protocol Specification (Release 7)", 3GPP TS 25.331 V7.3.0; Release 717T, Dec. 2006, 1316 pages.

"3rd Generation Partnership Project; Technical Specification Group Radio Access Network; Radio Resource Control (RRC) Protocol Specification (Release 7)", 3GPP TS 25.331 V7.5.0, Jun. 2007, 1429 pages.

"3rd Generation Partnership Project; Technical Specification Group Radio Access Network; Radio Resource Control (RRC) Protocol Specification (Release 7)", 3GPP TS 25.331 V7.7.0, Dec. 2007, 1469 pages.

"3rd Generation Partnership Project; Technical Specification Group Radio Access Network; Radio Resource Control (RRC) Protocol Specification (Release 8)", 3GPP TS 25.331 V8.1.0, Dec. 2007, 1471 pages.

"3rd Generation Partnership Project; Technical Specification Group Radio Access Network; User Equipment (UE) procedures in idle mode and procedures for cell reselection in connected mode (Release 1999)", 3GPP TS 25.304 V3.14.0, Mar. 2004, 41 pages.

"3rd Generation Partnership Project; Technical Specification Group Radio Access Network; User Equipment (UE) procedures in idle mode and procedures for cell reselection in connected mode (Release 4)", 3GPP TS 25.304 V4.8.0, Mar. 2004, 41 pages.

"3rd Generation Partnership Project; Technical Specification Group Radio Access Network; User Equipment (UE) procedures in idle mode and procedures for cell reselection in connected mode (Release 5)", 3GPP TS 25.304 V5.9.0, Sep. 2005, 44 pages.

"3rd Generation Partnership Project; Technical Specification Group Radio Access Network; User Equipment (UE) procedures in idle mode and procedures for cell reselection in connected mode (Release 6)", 3GPP TS 25.304 V6.9.0, Mar. 2006, 38 pages.

"3rd Generation Partnership Project; Technical Specification Group Radio Access Network; User Equipment (UE) procedures in idle mode and procedures for cell reselection in connected mode (Release 7)", 3GPP TS 25.304 7.1.0, Dec. 2006, 38 pages.

"3rd Generation Partnership Project; Technical Specification Group Radio Access Network; User Equipment (UE) procedures in idle mode and procedures for cell reselection in connected mode (Release 7)", 3GPP TS 25.304 7.4.0, Dec. 2007, 41 pages.

"3rd Generation Partnership Project; Technical Specification Group Radio Access Network; User Equipment (UE) procedures in idle mode and procedures for cell reselection in connected mode (Release 8)", 3GPP TS 25.304 8.0.0, Dec. 2007, 41 pages.

"Enhanced CELL_FACH state in FDD", WI RAN Meeting #33, RP-060606, Sep. 2006, 4 pages.

"Japanese Official Notice of Rejection", Japanese Patent Application No. 2009-549098, Jan. 6, 2012, 3 pages.

(56) References Cited

OTHER PUBLICATIONS

"Japanese Official Notice of Rejection (English Translation)", Japanese Patent Application No. 2009-549098, Jan. 6, 2012, 3 pages.
"Russian Decision on Grant", Russian Patent Application No. 2009133327/07(046848), Aug. 30, 2012, 14 pages.
"Russian Decision on Grant (Partial English Translation)", Russian Patent Application No. 2009133327/07(046848), Aug. 30, 2012, 6 pages.
"United States Final Office Action", U.S. Appl. No. 12/026,093, Oct. 6, 2011, 13 pages.
"United States Non-Final Office Action", U.S. Appl. No. 12/026,093, Jan. 25, 2011, 24 pages.
Ericsson, "Enhanced Paging Procedure", 3GPP TSG RAN WG2 #56bis, Tdoc R2-070031, Sorrento, Italy, Jan. 15-19, 2007, 3 pages.
Ericsson, "L2 Enhancements: CR to RLC", R2-071062; 3GPP TSG-RAN2 Meeting #57, Change Request to 25.322 CR draft, St. Louis, USA, Feb. 2007, 54 pages.
Nokia, et al., "Introduction of Enhanced CELL_FACH State", Tdoc R2-070508; Change Request 25.331; 3GPP TSG-2 Meeting #57, St. Louis, USA, Feb. 12-16, 2007, 67 pages.
Nokia, "Introduction of HS-DSCH Operation in CELL_FACH State", Tdoc R2-070505; Change Request 25.304; 3GPP TSG-RAN WG2 Meeting #57, St. Louis, USA, Feb. 12-16, 2007, 7 pages.
Nokia, et al., "Introduction of HS-DSCH Reception in CELL_FACH, UPA_PCH and Cell_PCH", Tdoc R2-072305; Change Request 25.331 CR 3003; 3GPP TSG-WG2 meeting #58, Kobe, Japan, May 7-11, 2007, 97 pages.
Nokia, Ericsson, "Stage 2 Updates for Enhanced CELL_FACH State in FDD", Tdoc R2-071121; Change Request 25.308 CR 0019; 3GPP TSG-RAN WG2 Meeting #57; St. Louis, USA, Feb. 12-16, 2007, 16 pages.
Nokia, Siemens Network, et al., "Introduction of PICH to HS-SCCH Timing Relation and Tx Diversity Definition for HS-DSCH Without Associated DL Dedicated Channel", Tdoc R1-072566; Change Request 25.331 CR 0239; 3GPP TSG-RAN1 Meeting #49, Kobe, Japan, May 7-11, 2007, 8 pages.
Nsn, et al., "Introduction of HS-DSCH reception in CELL_FACH, URA_PCH and CELL_PCH", 3GPP Tdoc R2-072168, 3GPP TSG RAN2 #58, Kobe, Japan, May 6-11, 2007, 1 Page.
QUALCOMM Europe, et al., "Principles for the new CELL_PCH/URA_PCH operation", Tdoc R2-071504; 3GPP TSG-RAN WG2 Meeting #57bis, Malta, Mar. 27-30, 2007, 4 pages.
QUALCOMM Europe, "Timing relation between PICH and HS-SCCH", Tdoc R2-070806; 3GPP TSG-RAN2 Meeting #57, St. Louis, USA, Feb. 12-16, 2007, 8 pages.
"United States Office Action", U.S. Appl. No. 12/026,093, filed Jun. 6, 2013, 9 pages.
"Taiwan Office Action", Taiwan Application No. 100107821, Nov. 27, 2014, 8 pages.
"Taiwan Office Action (English Translation)", Taiwan Application No. 100107821, Nov. 27, 2014, 6 pages.
"Chinese Office Action", Chinese Application No. 201210404378.9, Oct. 10, 2014, 6 pages.
"Chinese Office Action (English Translation)", Chinese Application No. 201210404378.9, Oct. 10, 2014, 6 pages.
"Japanese Notice of Allowance", Japanese Application No. 2012-195130, Mar. 25, 2014, 3 pages.
"Japanese Notice of Allowance (English Translation)", Japanese Application No. 2012-195130, Mar. 25, 2014, 3 pages.

* cited by examiner

PAGING OVER A HIGH-SPEED DOWNLINK SHARED CHANNEL

CROSS REFERENCE TO RELATED APPLICATIONS

This application is a Continuation of U.S. patent application Ser. No. 12/026,093 filed Feb. 5, 2008 which claims the benefit of U.S. Provisional Application Nos. 60/888,209 filed Feb. 5, 2007, 60/894,611 filed Mar. 13, 2007, and 60/895,248 filed Mar. 16, 2007, the contents of each of which being incorporated by reference as if fully set forth.

TECHNICAL FIELD

The subject matter disclosed herein relates to wireless communications methods and apparatus.

BACKGROUND

High-Speed Downlink Packet Access (HSDPA) was introduced in Release 5 of the Third Generation Partnership Project (3GPP) standards for wideband code division multiple access (WCDMA) wireless communication networks. A key operating principle of HSDPA is to share a fast downlink (DL) pipe. An example of a fast DL pipe is a high-speed downlink physical shared channel (HS-DPSCH). A universal mobile telecommunication system (UMTS) Terrestrial Radio Access Network (UTRAN) may configure up to 15 HS-DPSCHs. Each HS-DPSCH may be shared by all wireless transmit/receive units (WTRUs) operating within the network on a per transmission time interval (TTI) basis, for example, every 2 millisecond. As a result, information on the downlink channels may be sent to a different WTRU in every 2 millisecond interval.

In order to allow WTRUs to determine ownership of the information on HS-DPSCH shared channels, a base station also sends one or more parallel high-speed shared control channels (HS-SCCHs). Among other things, the HS-SCCHs provide detailed data to enable receiving WTRUs to determine which information transmitted on the HS-DPSCH is addressed to a particular WTRU and to enable the particular WTRU to recover the transmitted information.

In HSDPA, a base station utilizes three key concepts to achieve high-speed data transmission. The three key concepts are: adaptive modulation and coding (AMC), retransmissions using a hybrid-automatic repeat request (HARQ), and base station scheduling.

A base station may take advantage of the changing channel conditions as perceived by a WTRU in communication with the base station. In order to accomplish this, the base station can schedule transmissions to maximize DL throughput, for example, using 16 quadrature amplitude modulation (QAM) for a WTRU close to the base station and using quadrature phase shift keying (QPSK) for a WTRU at cell edge. Such fast scheduling is complemented with the use of HARQs, allowing retransmission of transport blocks that are received at a WTRU with errors. The HARQs are implemented at a physical layer and multiple simultaneous HARQ processes are permitted in order to maximize utilization.

An ongoing problem in HSDPA compliant networks is latency within the UTRAN, especially in setup delays for packet switched (PS) and circuit switched (CS) calls. Reducing the delay during WTRU state transitions is one way to improve network performance.

As illustrated in FIG. 1, a WTRU compliant with current standards can be in one of 4 possible states when in a connected mode, CELL_DCH, CELL_FACH, URA_PCH, or CELL_PCH. The WTRU state is based on WTRU traffic volume and mobility. The WTRU may communicate with the UTRAN only when in Cell_FACH or Cell_DCH states. Cell_PCH and URA_PCH states are intended for power saving operation. URA_PCH is used by a highly mobile WTRU that changes cells frequently. In both of these power saving states, the WTRU has no uplink mechanism to send traffic to the UTRAN. However, the WTRU can be paged to notify it to change states to either a Cell_FACH state or Cell_DCH state.

The paging procedure is a two step process. To save battery power, a WTRU is configured with a discontinuous reception (DRX) cycle that shuts off the WTRU's receiver chain periodically. This is known as sleep mode. A WTRU is only awake (the receiver chain is on) for certain frames known as paging occasions. Within each paging occasion, a WTRU listens for a Paging Indicator on a Paging Indicator Channel (PICH). The Paging Indicator instructs a WTRU to monitor the paging channel (PCH) carried in the Secondary Common Control Physical Channel (S-CCPCH). The PCH is a transport channel that is mapped to a logical Paging Control Channel (PCCH).

Multiple S-CCPCHs may be used. The WTRU selects from among the multiple S-CCPCHs based on an Initial WTRU Identity. The selected S-CCPCH is associated with a single PICH. This is the PICH that the WTRU monitors for paging indications. There is a strict delay requirement between the PICH and the associated paging message on the S-CCPCH. This delay offset is defined to allow the WTRU to receive the PICH and then the paging message. 3GPP Release 6 specifies this offset as 7,680 chips, or 2 millisecond. After recovering the PCCH, the WTRU can either enter the Cell_FACH state and perform a CELL UPDATE or return to sleep mode until the next paging occasion.

One technique for reducing this state transition time is to map the PCCH to a high-speed downlink shared channel (HS-DSCH) instead of the PCH. A faster downlink rate results in a shorter transmission time for the paging message and faster state transitions. This protocol stack architecture is shown in FIG. 2. The inventors have recognized several problems that exist when mapping the PCCH to the HS-DSCH.

First, HSDPA is currently only allowed in the Cell_DCH state and is controlled by the WTRU variable HS-DSCH_RECEPTION.

Second, the HS-DSCH must be configured to operate in the downlink. This involves assigning a WTRU an address HS-DSCH Radio Network Temporary Identifier (H-RNTI), configuring a HS-SCCH channelization code, and configuring HARQ information, such as the number of HARQ processes and memory partition. Currently, there is no mechanism defined to allow such a configuration in Cell_PCH and URA_PCH states.

Third, a WTRU in Cell_PCH or URA_PCH state is unable to send channel quality indication (CQI) information to the UTRAN because no uplink communication is possible. Thus, the base station cannot take full advantage of the AMC techniques required by HSDPA.

Fourth, once a WTRU receives a Paging Indicator on the PICH, the WTRU expects a paging message in the associated S-CCPCH. This S-CCPCH occurs 7,680 chips after the PICH. In HSDPA, a base station schedules WTRU traffic. While it is possible to maintain a strict timing relationship between the PICH and the HS-DSCH, maintaining this relationship restricts the base station scheduling flexibility for transmission over HS-DSCH. Limiting the base station scheduling flexibility for HS-DSCH is undesirable since other types of traffic (for example, dedicated traffic channel (DTCH) and dedicated control channel (DCCH) are also carried over HS-DSCH.

Therefore, HSDPA paging of a WTRU in CELL_PCH and URA_PCH states without the above mentioned disadvantages is desired.

SUMMARY

An apparatus and methods are provided for paging in a HSDPA connected mode CELL_PCH or URA_PCH state. Preferably, a WTRU is configured to select various PICH information that is broadcast by a base station. The WTRU is preferably configured to receive paging messages, based on the selected PICH information. In one embodiment, a preferred WTRU is configured to receive paging messages, based on a PICH, a HS-SCCH, and a HS-PDSCH. In another embodiment, a preferred WTRU is configured to receive paging messages, based on a PICH and a HS-PDSCH. In both embodiments, a time delay parameter is preferably used so that the WTRU may listen for either the HS-SCCH or HS-PDSCH for a period of time and return to a sleep mode if no paging message is received.

BRIEF DESCRIPTION OF THE DRAWINGS

A more detailed understanding may be had from the following description, given by way of example in conjunction with the accompanying drawings.

DETAILED DESCRIPTION

Figure 1:
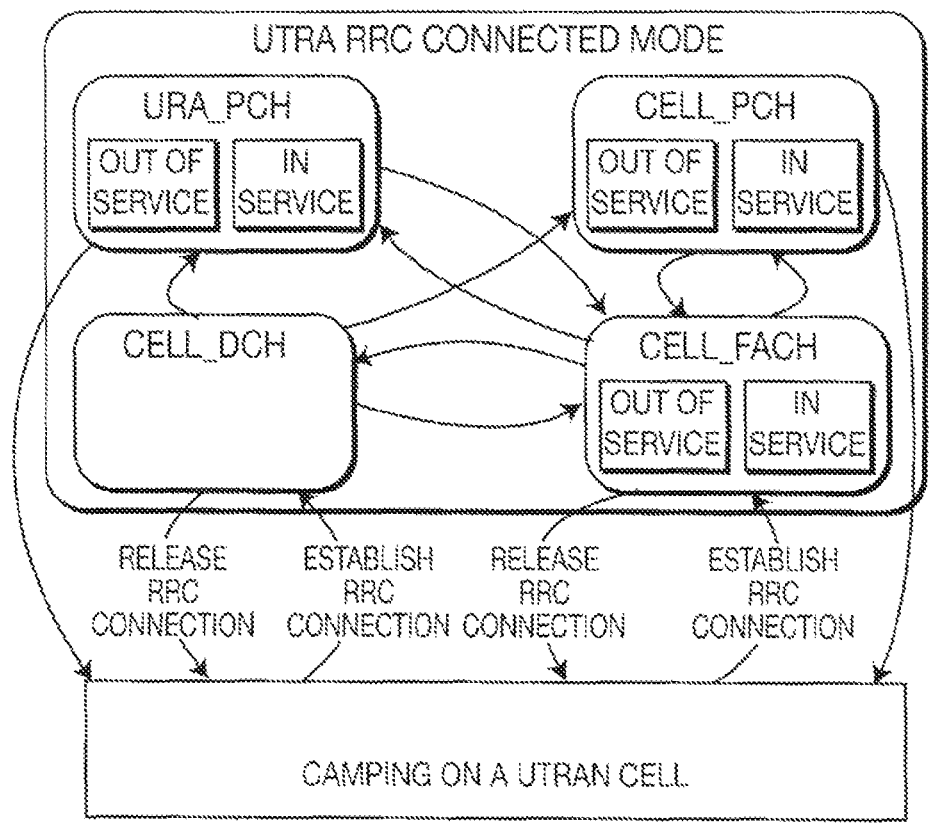
FIG. 1 is a block drawing of conventional WTRU states for a radio resource control (RRC) connected mode.

When referred to herein, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to herein, the terminology "base station" includes but is not limited to a Node-B, a site controller, an access point (AP), or any other type of interfacing device capable of operating in a wireless environment.

Apparatus and methods for paging in Cell_PCH and URA_PCH states in a high speed downlink packet access (HSDPA) wireless communication system are disclosed. Three preferred WTRU configurations and methods are disclosed, one in which utilization of a Paging Indicator Channel (PICH) is optional. A first preferred configuration and method utilizes a PICH and paging groups. A second preferred configuration and method utilizes paging groups, but instead of using a PICH, a high-speed shared control channel (HS-SCCH) signaling procedure allows each paging group to be associated with its own group high-speed downlink shared channel (HS-DSCH) radio network transaction identifier (H-RNTI). The PICH may optionally be retained for support of legacy WTRUs. A third preferred configuration and method utilizes a PICH and a high-speed downlink physical shared channel (HS-DPSCH).

In all three preferred configurations and methods, in order to map a Paging Control Channel (PCCH) to the HS-DSCH, high-speed channel configuration information must be provided to the WTRU. This configuration information may be received in a base station broadcast as part of the system information by adding a new information element to an existing system information block (SIB) and/or defining a new SIB and associated schedule.

The broadcasted configuration information may include: PCCH over HSDPA capability; a common HS-DSCH radio network transaction identifier (H-RNTI) to be used for paging messages; common high-speed downlink physical shared channel (HS-PDSCH) information including a HS-SCCH scrambling code and channelization code; common HARQ information including a number of HARQ processes, memory partitioning related parameters, and the like.

An exemplary broadcasted configuration information message is shown below in Table 1. The Need column indicates if the information element (IE) is a mandatory or optional parameter. MD indicates the IE is "mandatory" and must be broadcast and then received by UEs to be able to use the feature. The Multi column indicates for a parent parameter how many instances of the child parameter are allowed. For example, there can be 1 to <maxSCCPCH> of the PICH for HSDPA supported paging list.

TABLE 1

| Information Element/Group Name | Need | Multi | Type and Reference | Semantics Description |
|---|---|---|---|---|
| DL Scrambling Code | MD | | Secondary scrambling code | DL Scrambling code to be applied for HS-DSCH and HS-SCCH. Default is same scrambling code as for the primary CPICH. |
| PICH for HSDPA supported paging list | MP | 1 to <maxSCCPCH> | | |
| >HSDPA associated PICH info | MP | | PICH info | |

TABLE 1-continued

| Information Element/Group Name | Need | Multi | Type and Reference | Semantics Description |
|---|---|---|---|---|
| >HS-PDSCH Channelisation Code | MP | | Integer (0 ... 15) | HS-PDSCH channel, associated with the PICH for HS-SCCH less PAGING TYPE 1 message transmission. |
| Number of PCCH transmissions | MP | | Integer (1 ... 5) | number of subframes used to transmit the PAGING TYPE 1. |
| Transport Block Size List | MP | 1 ... 2 | | |
| >Transport Block Size Index | MP | | Integer (1 ... 32) | Index of valuerange 1 to 32 of the MAC-ehs transport block size |

The HSDPA associated PICH information element shown in Table 1 may also be broadcast and received along with an information element DL-HSPDSCH system information that is used for a WTRU operating in CELL_FACH state, or these elements may be broadcast to WTRUs only operating in CELL_PCH or URA_PCH states.

Figure 3:
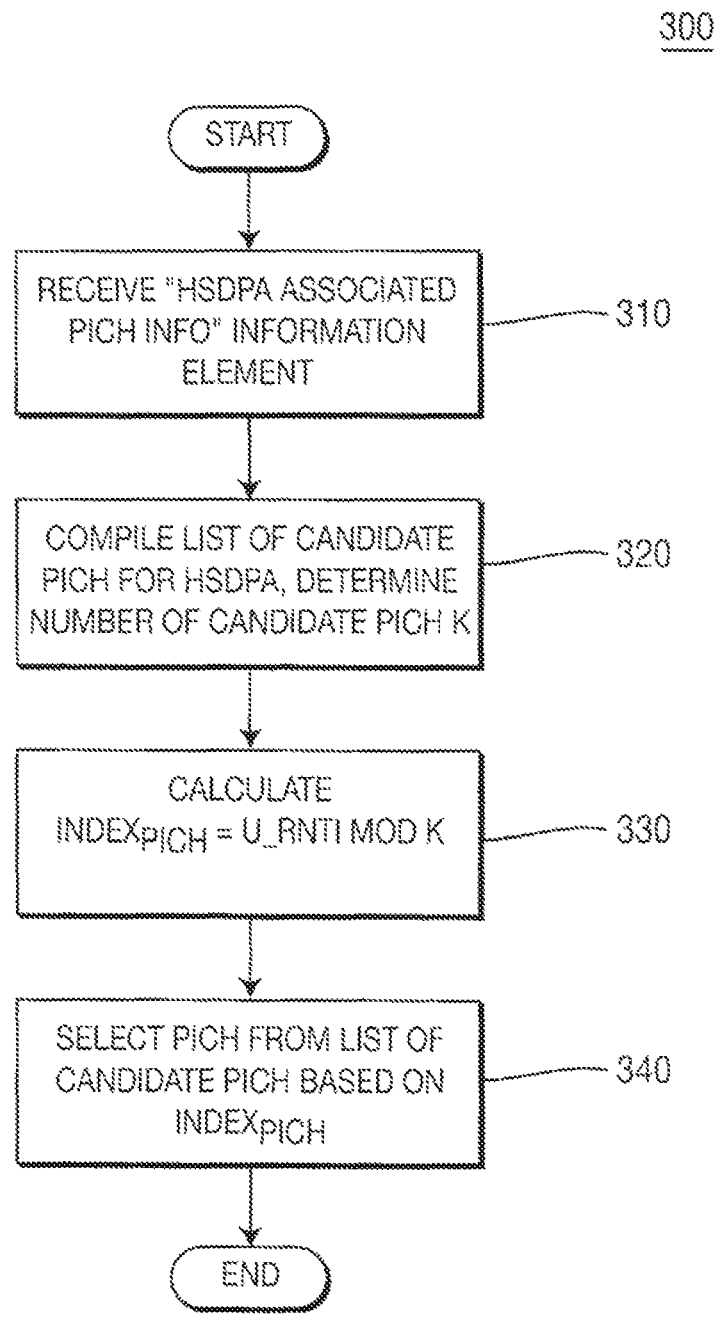
FIG. 3 is a flow diagram of a method for selecting PICH information from received system information broadcasts.

Referring to FIG. 3, a method 300 for selecting PICH information for HSPDA based paging is illustrated for an appropriately configured WTRU. The method 300 begins with receiving an "HSDPA Associated PICH Info" information element (IE), (step 310). This IE is transmitted from a base station, and may be broadcast. After receiving the IE, a WTRU compiles a list of candidate PICH for HSDPA information and determines a value k that corresponds to the number of candidates, (step 320). The WTRU then calculates a PICH candidate selection index, $Index_{PICH}$ according to equation (1):

$$Index_{PICH} = U\text{-}RNTI \bmod k;\qquad \text{Equation (1)}$$

where U-RNTI is the UTRAN radio network temporary identifier, (step 330). The WTRU finally selects the PICH information from the compiled list based on the calculated $Index_{PICH}$, (step 340).

Figure 4:
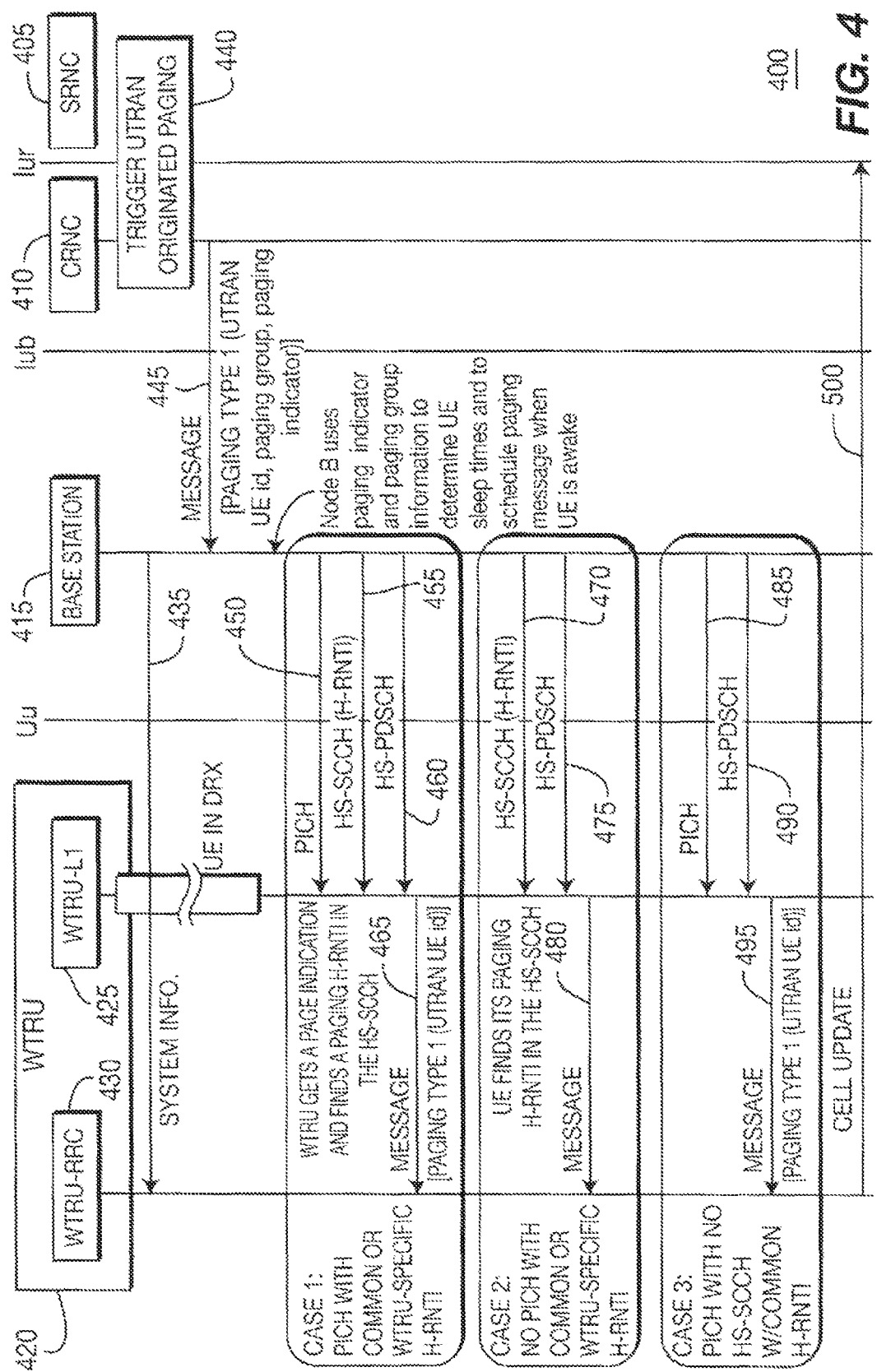
FIG. 4 is a procedural diagram illustrating several HSDPA paging procedures in accordance with the teachings of the present invention.

Referring to FIG. 4, a signal flow diagram 400 of preferred HSDPA paging procedures disclosed herein includes a Serving Radio Network Controller (SRNC) 405, a Controlling Radio Network Controller (CRNC) 410, a Base Station 415, and a WTRU 420. The signal flow diagram 400 generally shows the radio resource control (RRC) layer of all entities depicted, with the exception of the WTRU 420, which shows both a WTRU physical layer, WTRU-L1, 425 and a WTRU RRC 430 layer. It should be understood however that various layers may perform the described functions. The example signal flow diagram 400 is based on a WTRU in discontinuous reception (DRX) mode.

The base station 415 uses the DRX information of the WTRU 420 for scheduling paging messages destined for the WTRU 420. In this manner, the base station 415 will schedule paging messages destined for the WTRU 420 when the WTRU 420 is not in a sleep mode, thereby reducing the amount of time the WTRU 420 must monitor the HS-SCCH. When the WTRU 420 enters a CELL_PCH or a URA_PCH state, the WTRU 420 receives system information to configure the HSDPA paging channel, (step 435). The WTRU 420 may then determine its common paging H-RNTI as well as the HS-SCCH and/or HS-PDSCH and HARQ setup details. Alternatively, a WTRU-specific H-RNTI may be used for paging. There can be any number of HS-SCCHs associated with the paging channel and the WTRU 420 can select from among these using procedures known to those skilled in the art, such as those based on the initial WTRU identity.

With specific reference now to Case 1 within FIG. 4, when the UTRAN needs to page the WTRU 420, a signal is received at the SRNC 405. The SRNC 405 forwards the message to the CRNC 410 via the Iur interface, if necessary, (step 440). The CRNC 410 forwards a message that is destined to the WTRU (for example, a Paging Type 1 message) to the base station 415 via the Iub interface, (step 445). A scheduler function resident in the base station 415, which has information relating to the DRX timing of the WTRU-L1 425, guarantees that the message is sent only during the WTRU awake time. This can be implemented in a variety of ways that will be apparent to those skilled in the art. Purely for example, the base station 415 may maintain a paging transmit queue common to all WTRU being served by the base station 415. Immediately prior to the WTRU-L1 425 entering an awake state of its DRX mode, the scheduling function of the base station 415 queries the paging transmit queue to determine whether a message is destined for WTRU-L1 415. If the determination is positive, the base station 415 transmits a paging indicator on the PICH, (step 450).

After a time interval $T_{PICH}$, which is between a minimum time delay $T_{PICH\_HSSCCH\_MIN}$ and a maximum time delay $T_{PICH\_HSSCCH\_MAX}$, the base station 415 transmits the corresponding message using a common or WTRU-specific paging H-RNTI address on the HS-SCCH, (step 455), and the message is mapped to the HS-PDSCH, (step 460). The parameter $T_{PICH\_HSSCCH\_MIN}$ may be hard coded and predetermined. The parameter $T_{PICH\_HSSCCH\_MAX}$ may be broadcast from the base station 415 as part of the system information or other system transmission or broadcast. The time delay parameter $T_{PICH}$ may be defined mathematically as follows:

$$T_{PICH\_HSSCCH\_MIN} \leq T_{PICH} \leq T_{PICH\_HSSCCH\_MAX}\qquad \text{Equation (2)}$$

An alternative method for timing the transmission of the PICH and subsequent transmission channels may be used. When the message is forwarded by the CRNC 410 to the base station 415, the base station 415 again stores the message in a WTRU specific transmission queue. A scheduling function of the base station 415 schedules the message for transmission to WTRU 420 during an awake time based on DRX information of the WTRU 420. The message is scheduled during a future transmission time interval (TTI). In other words, the message is scheduled for transmission based on a current TTI ($TTI_{Current}$), plus a time delta, $\Delta$. The base station 415 calculates $\Delta$ based on the WTRU-L1 425 DRX cycle. During the time interval $\Delta$, the base station 415 may perform further scheduling algorithms to determine whether any MAC-hs packet data units (PDUs) require transmission in the current TTI, $TTI_{Current}$. The base station 415 may then transmit the paging indicator on the PICH immediately prior to the scheduled future time ($TTI_{Current}+\Delta$). The time between PICH and associated TTI may be fixed or variable and may be hardcoded or broadcast as part of the system information.

The WTRU-L1 425 monitors the PICH when awake looking for a paging indicator. When a paging indicator is found, the WTRU-L1 425 monitors the HS-SCCH during the time interval, $T_{PICH}$ or $\Delta$, depending on which of the above embodiments are utilized, looking for a H-RNTI. If the paging indicator is not found, the WTRU-L1 425 re-enters sleep mode and waits for the next paging indicator opportunity. If the WTRU-L1 425 successfully receives a paging indicator and the common or WTRU-specific paging H-RNTI, the WTRU-L1 425 retrieves the message from the HS-PDSCH and forwards the message to the higher layer WTRU RRC 430, (step 465).

Alternatively, in Case 2 as shown in FIG. 4, no PICH is used. Upon receiving a message via the Iub interface from the CRNC 410, such as a paging type I message, the base station 415 transmits a message to the WTRU-L1 425 over the HS-SCCH via the Uu interface, (step 470). Either a group or WTRU-specific H-RNTI may be used. The paging message may be transmitted within a predetermined number of TTIs after the WTRU's 420 scheduled DRX wakeup time, or within a time interval window $T_{PICH}$ as described above. When the WTRU 420 determines that a paging indicator is present and addressed to the WTRU 420, the appropriate HS-PDSCH is monitored by the WTRU-L1 425, (step 475), and the message is received and forwarded to higher layers, (step 480).

Alternatively, in Case 3 as shown in FIG. 4, a PICH is used but no HS-SCCH is required. Upon receiving a message via the Iub interface from the CRNC 410 such as a paging type I message, the base station 415 transmits a message to the WTRU-L1 425 over the PICH via the Uu interface, (step 485). After a time interval $T_{PICH}$, which is between $T_{PICH\_HSPDSCH\_MIN}$ and $T_{PICH\_HSPDSCH\_MAX}$, as described below with reference to Equation 3, the base station 415 transmits a HS-PDSCH(s), (step 490). When the WTRU 420 is configured for operation with common H-RNTI (in other words a dedicated H-RNTI has not been assigned), the WTRU-L1 425 receives the transmitted HS-PDSCHs transmitted between $T_{PICH\_HSSCCH\_MIN}$ and $T_{PICH\_HSSCCH\_MAX}$ after detection of the PICH. No HS-SCCH is required. If a positive CRC is obtained from one or a soft-combination of any of the HS-PDSCHs, the received message is forwarded to higher layers, (step 495).

In the cases described above, if no message is received over any of the various channels within the determined time interval ($T_{PICH}$ or $\Delta$), the WTRU may then re-enter a sleep mode. In the various embodiments described above, a cell update procedure that is known to those skilled in the art may be performed after the WTRU 420 receives and processes the paging message, (step 500).

Figure 5:
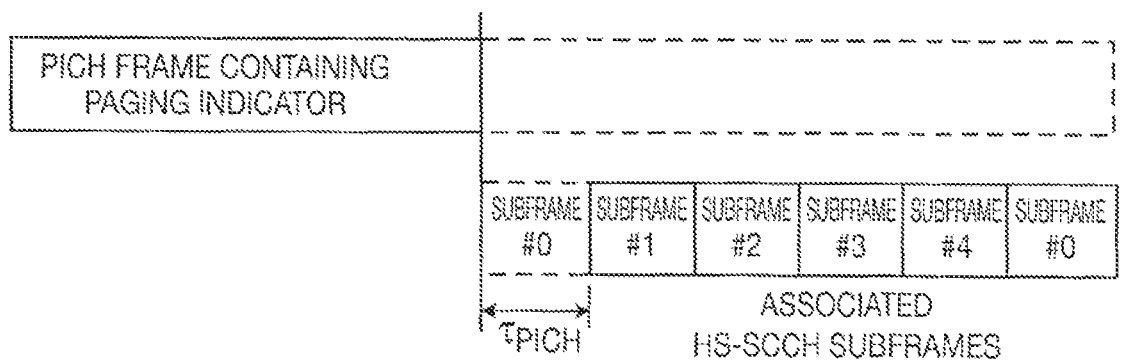
FIG. 5 is a timing diagram showing a timing relationship between a PICH frame and associated high-speed shared control channel (HS-SCCH) subframes.
Figure 2:
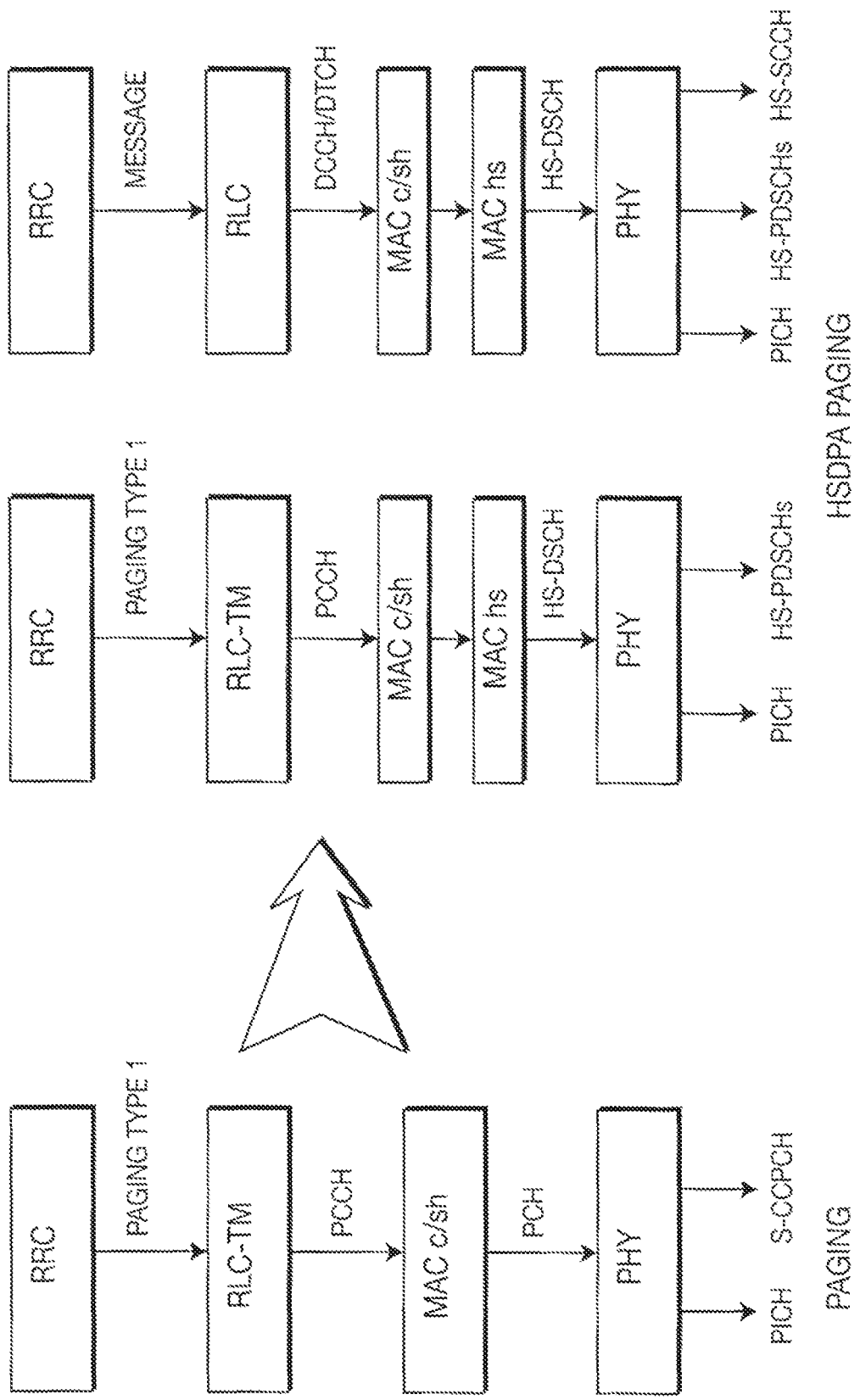
FIG. 2 are comparative stack diagrams providing a comparison of a conventional Paging Channel (PCH) protocol stack architecture for mapping a logical Paging Control Channel (PCCH) with the mapping of a PCCH to a HS-DSCH for HSDPA paging and a mapping of a DCCH/DTCH to a HS-DSCH for HSPDA paging.

In Case 1 of FIG. 4, a time delay exists between the PICH frame that includes the paging indicators and the first received subframe of the associated HS-SCCH received at the WTRU. The delay $T_{PICH}$ between the PICH and following message transmitted over the HS-SCCH is defined by Equation 2 above and is between $T_{PICH\_HSSCCH\_MIN}$ and $T_{PICH\_HSSCCH\_MAX}$. Typically, the base station will start transmitting the HS-SCCH $T_{PICH\_HSSCCH\_MIN}$ after the PICH is transmitted. However, the base station could wait until $T_{PICH\_HSSCCH\_MAX}$ to transmit the HS-SCCH. This timing relationship is shown in FIG. 5. The first subframe of the associated HS-SCCH begins after a time delay, $T_{PICH}$, after the transmitted PICH frame.

In case 3 of FIG. 4, a time delay exists between the PICH frame that includes the paging indicators and the first received subframe of the associated HS-PDSCH(s). Similar to Equation 2 above, the delay $T_{PICH}$ between the PICH and following message transmitted over the HS-PDSCH(s) is defined as:

$$T_{PICH\_HSPDSCH\_MIN} \leq T_{PICH} \leq T_{PICH\_HSPDSCH\_MAX} \quad \text{Equation (3)}$$

Figure 6:
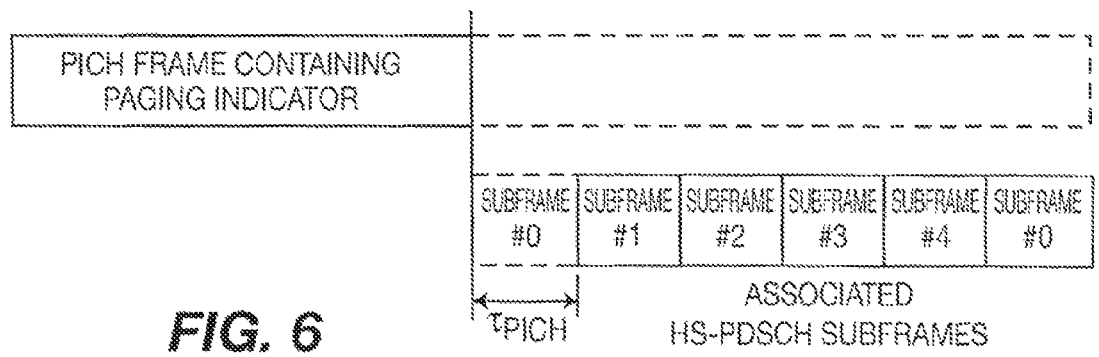
FIG. 6 is a timing diagram showing a timing relationship between a PICH frame and associated HS-PDSCH subframes.

Typically, the base station will start transmitting the HS-PDSCH $T_{PICH\_HSPDSCH\_MIN}$ after the PICH is transmitted. However, the base station could wait until $T_{PICH\_HSPDSCH\_MAX}$ to transmit the HS-PDSCH. This timing relationship is shown in FIG. 6. The first subframe of the associated HS-PDSCH begins after a time delay, $T_{PICH}$, after the transmitted PICH frame.

In addition to the configurations and methods described above, the rules for evaluating the Boolean variable HS_DSCH_RECEPTION may be modified to allow HSDPA reception in the Cell_PCH state and the URA_PCH state. In particular, the variable should evaluate to TRUE (i.e. paging via HSDPA is supported) when: a WTRU is in Cell_PCH and URA_PCH state, the DL radio link is configured as the serving HS-DSCH radio link, and there is at least one radio bearer mapped to HS-DSCH.

Figure 7:
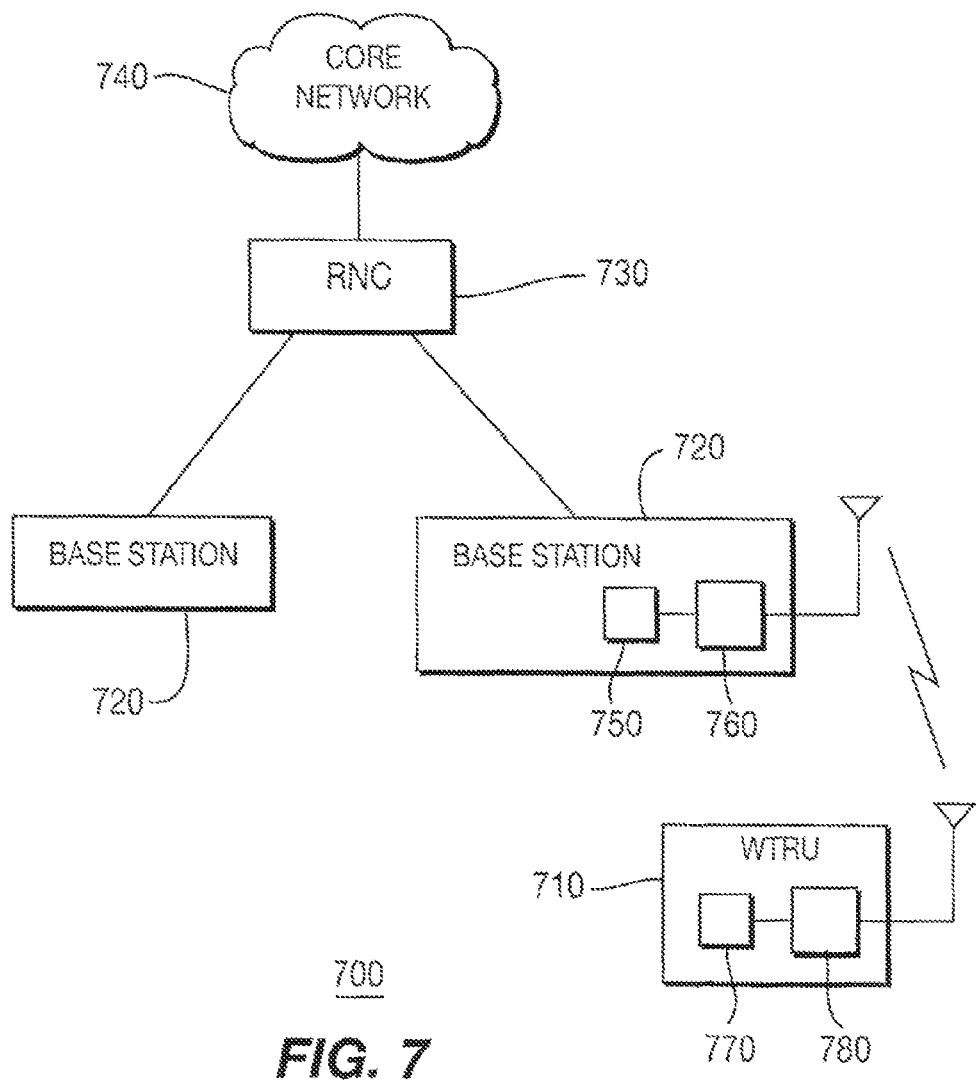
FIG. 7 is an illustration of an HSDPA network configured for paging in accordance with the teachings of the present invention.

Referring to FIG. 7, a HSDPA capable wireless communication network 700 includes a WTRU 710, a base station 720, an RNC 730, and a core network 740. Base station 720 includes a scheduler 750 for scheduling paging messages over the PICH, HS-SCCH, and HS-PDSCH as described herein. The scheduler 750 may also include processing capabilities for processing various base station information received from both the RNC 730 and the WTRU 710 via the base station 720 transceiver 760. The WTRU 710 includes a processor 770 and a transceiver 780. The processor 770 is preferably configured to perform various processing tasks required by the WTRU 710, such as those described above with reference to FIG. 3 and FIG. 4. The processor 770 is further preferably configured to control a DRX cycle of the WTRU 710 and provide DRX information to the base station 720 as desired. The transceiver 780 is preferably configured to receive various channels transmitted by the base station 720, including the PICH, HS-SCCH, and HS-PDSCH.

Alternatively, the requirement for the Node-B to schedule a PCH packet within a predefined time after a paging indicator is sent can be relaxed. This will allow more scheduling flexibility to the Node-B. Specifically, in this case once a UE's group is paged via a PICH, a UE may stay awake past $T_{PICH\_HSPDSCH\_MAX}$ waiting for a common paging H-RNTI or until a configured timer expires (the timer parameter can be broadcast as part of the system information or can be hardcoded). The Node-B may utilize this in its schedule to schedule a PCH later. However, the delivery of the page is not guaranteed in this case as, once $T_{PICH\_HSPDSCH\_MAX}$ has passed, the Node-B has no knowledge of how long the UE remains awake.

In certain embodiments, the Node-B can broadcast minimal and maximal delays.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for a wireless transmit/receive unit (WTRU) to facilitate paging in high speed downlink packet access (HSDPA) wireless communications, the method comprising:
   receiving, from a broadcast, system information indicating a delay between reception of a paging indicator and reception of a message;
   when the WTRU is operating in a cell paging channel (CELL_PCH) state or a UTRAN Registration Area (URA) paging channel (URA_PCH) state:
   receiving, from a base station, HSDPA associated paging indicator channel (PICH) information elements comprising PICH information,
   compiling a list of candidate PICHs for HSDPA after receiving the information elements,
   determining a value k corresponding to a number of candidates,
   calculating a selection index equal to:
   U_RNTI mod k,
   where U_RNTI is a universal mobile telecommunications system (UMTS) terrestrial radio access network (UTRAN) radio network transaction identity (U-RNTI) of the WTRU, and
   selecting a PICH information from the list of candidate PICHs based on the selection index;
   awakening from a sleep mode during paging occasions;
   monitoring for the paging indicator over a PICH using the selected PICH information;
   monitoring for the message on a high speed physical downlink shared channel (HS-PDSCH) based on the received system information, wherein a maximum delay between the receptions of the paging indicator and the message is pre-determined; and
   returning to the sleep mode, if no message is received over the HS-PDSCH.

2. The method of claim 1, wherein the monitoring for the message comprises: monitoring, after waiting the delay, for reception of the message.

3. A wireless transmit/receive unit (WTRU) configured for high speed downlink packet access (HSDPA) wireless communications, the WTRU comprising a transmit/receive unit and a processor configured to:
   receive, from a broadcast, system information indicating a delay between reception of a paging indicator and reception of a message;
   when the WTRU is operating in a cell paging channel (CELL_PCH) state or a UTRAN Registration Area (URA) paging channel (URA_PCH) state:
   receive, from a base station, HSDPA associated paging indicator channel (PICH) information elements comprising PICH information,
   compile a list of candidate PICHs for HSDPA using the information elements,
   determine a value k corresponding to a number of candidates,
   calculate a selection index equal to:
   U_RNTI mod k,
   where U_RNTI is a universal mobile telecommunications system (UMTS) terrestrial radio access network (UTRAN) radio network transaction identity (U-RNTI) of the WTRU, and
   select a PICH information from the list of candidate PICHs based on the selection index;
   awaken from a sleep mode during paging occasions;
   monitor for the paging indicator over a PICH using the selected PICH information;
   monitor for the message on a high speed physical downlink shared channel (HS-PDSCH) based on the received system information, wherein a maximum delay between the receptions of the paging indicator and the message is pre-determined; and
   return to the sleep mode, if no message is received over the HS-PDSCH.

4. The WTRU of claim 3, wherein the WTRU is configured to:
   receive a common high speed downlink shared channel (HS-DSCH) radio network transaction identity (H-RNTI); and
   receive the message on the HS-PDSCH using the received common H-RNTI.

5. The WTRU of claim 4, wherein the WTRU is configured to:
   monitor, after waiting the delay, for the reception of the message.

6. A method for a wireless transmit/receive unit (WTRU) to facilitate paging in high speed downlink packet access (HSDPA) wireless communications, the method comprising:
   receiving, from a broadcast, system information indicating a delay between reception of a paging indicator and reception using a high speed shared channel;
   when the WTRU is in one of a cell paging channel (CELL_PCH) state or a UTRAN Registration Area (URA) paging channel (URA_PCH) state:
   receiving, from a base station, HSDPA associated paging indicator channel (PICH) information elements comprising PICH information,
   compiling a list of candidate PICHs for HSDPA after receiving the information elements,
   determining a value k corresponding to a number of candidates;
   calculating a selection index equal to:
   U_RNTI mod k,
   where U_RNTI is a universal mobile telecommunications system (UMTS) terrestrial radio access network (UTRAN) radio network transaction identity (U-RNTI) of the WTRU, and
   selecting a PICH information from the list of candidate PICHs based on the selection index;
   awakening from a sleep mode during paging occasions;

monitoring for the paging indicator over a PICH using the selected PICH information;

monitoring for a high speed downlink shared channel (HS-DSCH) radio network transaction identity (H-RNTI);

monitoring the high speed shared channel using the H-RNTI on condition that the H-RNTI is received based on the received system information, wherein a maximum delay between the reception of the paging indicator and the reception using the high speed shared channel is pre-determined; and returning to the sleep mode, if no H-RNTI is received or the maximum delay has expired.

7. The method of claim 6, further comprising:
receiving the H-RNTI; and
receiving a high speed physical downlink shared channel (HS-PDSCH) based on the received H-RNTI.

8. A wireless transmit/receive unit (WTRU) configured for high speed downlink packet access (HSDPA) wireless communications, the WTRU comprising:

a transmit/receive unit and a processor configured to:

receive, from a broadcast, system information indicating a delay between reception of a paging indicator and reception using a high speed shared channel;

when the WTRU is in one of a cell paging channel (CELL_PCH) state or a UTRAN Registration Area (URA) paging channel (URA_PCH) state:

receive, from a base station, HSDPA associated paging indicator channel (PICH) information elements comprising PICH information, compile a list of candidate PICHs for HSDPA after receiving the information elements, determine a value k corresponding to a number of candidates, calculate a selection index equal to:

U_RNTI mod k, where U_RNTI is a universal mobile telecommunications system (UMTS) terrestrial radio access network (UTRAN) radio network transaction identity (U-RNTI) of the WTRU, and select a PICH information from the list of candidate PICHs based on the selection index;

awaken from a sleep mode during paging occasions;

monitor for the paging indicator over a PICH using the selected PICH information;

monitor for a high speed downlink shared channel (HS-DSCH) radio network transaction identity (H-RNTI);

monitor the high speed shared channel using the H-RNTI on condition that the H-RNTI is received based on the received system information, wherein a maximum delay between the reception of the paging indicator and the reception using the high speed shared channel is pre-determined; and return to the sleep mode, if no H-RNTI is received or the maximum delay has expired.

9. The WTRU of claim 8, wherein the WTRU is configured to:

receive the H-RNTI; and receive a high speed physical downlink shared channel (HS-PDSCH) based on the received H-RNTI.

* * * * *